(12) United States Patent
Flachsbart et al.

(10) Patent No.: US 11,290,753 B1
(45) Date of Patent: *Mar. 29, 2022

(54) SYSTEMS AND METHODS FOR ADAPTIVE LIVESTREAMING

(71) Applicant: United Services Automobile Association (USAA), San Antonio, TX (US)

(72) Inventors: Matthew T. Flachsbart, Grapevine, TX (US); Richard Daniel Graham, Plano, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/108,768

(22) Filed: Dec. 1, 2020

Related U.S. Application Data

(63) Continuation of application No. 15/497,607, filed on Apr. 26, 2017, now Pat. No. 10,887,628.

(60) Provisional application No. 62/328,107, filed on Apr. 27, 2016.

(51) Int. Cl.
| | | |
|---|---|---|
| *H04N 21/2187* | (2011.01) | |
| *H04N 21/234* | (2011.01) | |
| *H04N 21/81* | (2011.01) | |
| *G06K 9/00* | (2022.01) | |
| *H04N 21/442* | (2011.01) | |
| *H04N 21/472* | (2011.01) | |
| *H04N 21/258* | (2011.01) | |
| *H04N 21/235* | (2011.01) | |
| *H04N 7/18* | (2006.01) | |

(52) U.S. Cl.
CPC ..... *H04N 21/2187* (2013.01); *G06K 9/00718* (2013.01); *H04N 7/183* (2013.01); *H04N 21/2353* (2013.01); *H04N 21/23418* (2013.01); *H04N 21/23424* (2013.01); *H04N 21/25891* (2013.01); *H04N 21/44218* (2013.01); *H04N 21/47217* (2013.01); *H04N 21/816* (2013.01)

(58) Field of Classification Search
None
See application file for complete search history.

(56) References Cited

U.S. PATENT DOCUMENTS

| | | | |
|---|---|---|---|
| 5,729,471 A * | 3/1998 | Jain | H04N 13/117 725/131 |
| 9,100,540 B1 | 8/2015 | Gates et al. | |
| 9,445,048 B1 | 9/2016 | Nariyawala et al. | |
| 9,633,270 B1 * | 4/2017 | Tangeland | G10L 17/00 |
| 2002/0101505 A1 | 8/2002 | Gutta et al. | |
| 2004/0105004 A1 | 6/2004 | Rui et al. | |
| 2006/0013416 A1 | 1/2006 | Truong et al. | |
| 2006/0248210 A1 | 11/2006 | Kenoyer | |
| 2010/0123770 A1* | 5/2010 | Friel | H04N 7/15 348/14.08 |
| 2010/0309284 A1 | 12/2010 | Samadani et al. | |

(Continued)

*Primary Examiner* — Alexander Q Huerta
(74) *Attorney, Agent, or Firm* — BakerHostetler (57) ABSTRACT

Systems, methods, and computer products provide techniques handling media data based on triggers. A video portion of a first stream and an audio portion of a second stream can be merged based on correlation of the streams and quality analyses of the respective video and audio portions. A variety of triggers can be identified and utilized to determine the use or playback of streams.

20 Claims, 6 Drawing Sheets

(56) References Cited

U.S. PATENT DOCUMENTS

| | | |
|---|---|---|
| 2011/0242286 A1 | 10/2011 | Pace et al. |
| 2011/0285808 A1 | 11/2011 | Feng et al. |
| 2012/0127262 A1 | 5/2012 | Wu et al. |
| 2012/0320143 A1* | 12/2012 | Chu .................. G01S 3/8036 348/14.08 |
| 2014/0168354 A1* | 6/2014 | Clavel ............. H04N 21/4788 348/14.09 |
| 2014/0317532 A1 | 10/2014 | Ma et al. |
| 2015/0244981 A1 | 8/2015 | Johnson |
| 2015/0244987 A1* | 8/2015 | Delegue .............. H04M 3/567 348/14.09 |
| 2016/0255126 A1* | 9/2016 | Sarris ................... H04N 7/155 348/14.08 |
| 2016/0275952 A1* | 9/2016 | Kashtan ............... H04M 3/563 |
| 2016/0316174 A1* | 10/2016 | Whynot ............... H04L 65/80 |

\* cited by examiner

SYSTEMS AND METHODS FOR ADAPTIVE LIVESTREAMING

CROSS REFERENCE TO RELATED APPLICATION

This application is a continuation of and claims the benefit of and priority to U.S. patent application Ser. No. 15/497,607, filed Apr. 26, 2017, which application claims the benefit to and priority of U.S. Provisional Patent Application No. 62/328,107, filed Apr. 27, 2016, which is incorporated herein in its entirety by reference.

TECHNICAL FIELD

The present disclosure generally relates to network communications, and more specifically to implementing video technology in a livestreaming environment.

BACKGROUND

A wide variety of media is available today. However, use and control of such media remains a challenge for remote viewers interacting with such media.

Immersive videos, also known as 360 degree videos or spherical videos, are real-world panorama videos in which the view in every direction is captured at the same time, such as through the use of omni-directional cameras or through multiple cameras. During playback of immersive videos, the viewer can control the viewing direction.

Traditionally, because of the video processing demands for organizing video data in order to timely respond to viewer's control of the viewing direction, immersive videos are not currently available for livestreaming, particularly when the livestream feed is available to multiple viewers simultaneously. Thus, even for live events, like concerts and conferences, immersive video is not available in real time.

SUMMARY

In an embodiment, a method comprises receiving two or more streams of media data from two or more sensors; identifying a first trigger associated with a first triggered stream among the two or more streams, wherein the first trigger is responsive to an action detected by one of the two or more sensors; identifying a second trigger associated with a second triggered stream among the two or more streams of media data; correlating the first triggered stream to the second triggered stream; merging at least a video portion of the first triggered stream and an audio portion of the second triggered stream for playback, wherein the video portion contains higher quality video data than video data associated with the second triggered stream based on one or more of lighting, the presence or absence of glare, the presence or absence of reflections, stream resolution, camera stability, the presence or absence of obstructions, or an amount of noise, and wherein the audio portion contains higher quality audio data than audio data associated with the first triggered stream based on a signal to noise measurement.

In an embodiment, a media input module configured to receive two or more streams of media data from two or more sensors; a trigger detection module configured to identify a first trigger associated with a first triggered stream among the two or more streams, wherein the first trigger is responsive to an action detected by one of the two or more sensors, wherein the trigger detection module is further configured to identify a second trigger associated with a second triggered stream among the two or more streams of media data; a categorizing module configured to correlate the first triggered stream to the second triggered stream; and a media output module configured to merge at least a video portion of the first triggered stream and an audio portion of the second triggered stream for playback, wherein the video portion contains higher quality video data than video data associated with the second triggered stream based on one or more of lighting, the presence or absence of glare, the presence or absence of reflections, stream resolution, camera stability, the presence or absence of obstructions, or an amount of noise, and wherein the audio portion contains higher quality audio data than audio data associated with the first triggered stream based on a signal to noise measurement.

In an embodiment, a non-transitory computer-readable medium storing a computer product that when used performs operations comprising: receiving two or more streams of media data from two or more sensors; identifying a first trigger associated with a first triggered stream among the two or more streams, wherein the first trigger is responsive to an action detected by one of the two or more sensors; identifying a second trigger associated with a second triggered stream among the two or more streams of media data; correlating the first triggered stream to the second triggered stream; merging at least a video portion of the first triggered stream and an audio portion of the second triggered stream for playback, wherein the video portion contains higher quality video data than video data associated with the second triggered stream based on one or more of lighting, the presence or absence of glare, the presence or absence of reflections, stream resolution, camera stability, the presence or absence of obstructions, or an amount of noise, and wherein the audio portion contains higher quality audio data than audio data associated with the first triggered stream based on a signal to noise measurement.

These and other embodiments are described in greater detail elsewhere herein. In some of the following descriptions a particular embodiment and its details are used to illustrate the disclosed aspects. The applicability of the method is not limited to the particular embodiments described herein.

BRIEF DESCRIPTION OF THE DRAWINGS

The accompanying appendices and/or drawings illustrate various non-limiting, example aspects in accordance with the present disclosure.

DETAILED DESCRIPTION

Adaptive control of immersive video views or other media data may be advantageous to simulate an in-person experience for multiple viewers at a live event or who seek to efficiently manage a plurality of available streams or sources related to a previously-recorded event.

In an example, a meeting can be livestreamed to a variety of participants. The meeting may include media streams from a number of participants, who can be broadcasting individually (e.g., one participant in stream) or in groups (e.g., conference room with multiple participants in stream). In an embodiment, one participant or a group of participants can have two or more sensors or devices and provide multiple combined or disparate media streams. In an embodiment, a single sensor can collect sufficient media data that it can be portioned, filtered, or modified (e.g., zoomed, cropped). Based on various predefined or user-defined triggers, media streams and/or portions thereof can be selected for playback alone or in combination at various points in time during the event. Trigger-based playback can be common to all participants or different for two or more participants. Where playback is different between two or more viewers or participants, it can be based on, e.g., user defined triggers (e.g., user prefers particular views or streams), roles in the meeting or title (e.g., supervisor, project lead, subordinate to a particular working group), location (e.g., show views of remote locations, show views of home office if located elsewhere), and others. While this example is given in the context of a meeting, the meeting context is not exclusive, and other contexts leveraging aspects herein are embraced by the scope and spirit of the disclosure.

Figure 1:
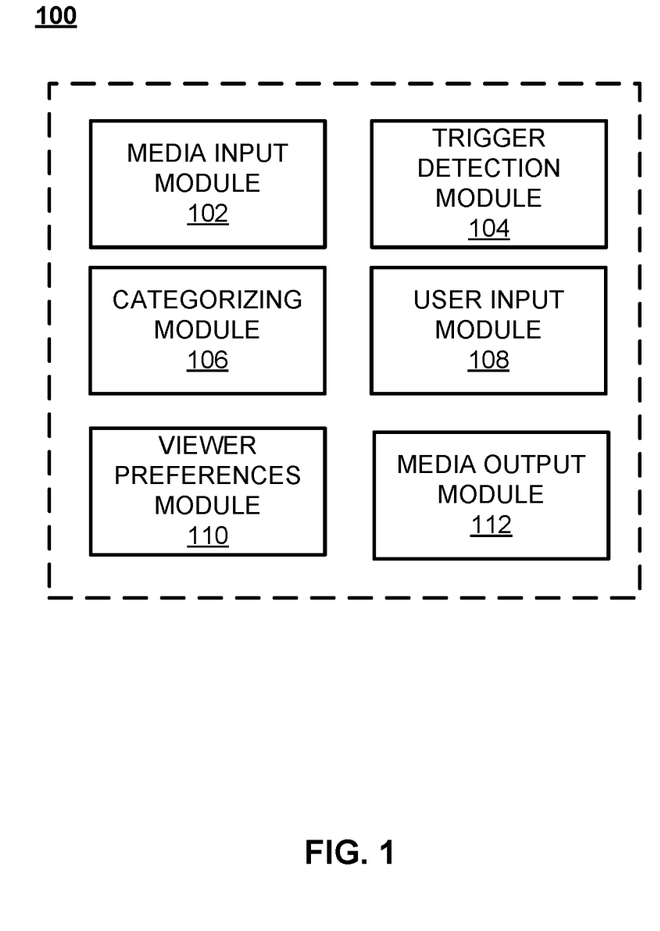
FIG. 1 is a block diagram of a system disclosed herein for handling media data.

Now referring to the drawings, wherein like reference numbers refer to like elements, there is illustrated a system 100 in accordance with an aspect of the disclosure. As shown in FIG. 1, for example, system 100 may provide a variety of modules that may be used to process and output video streams.

While system 100 shows the modules associated with one another, various embodiments can distribute, separate, or exclude the illustrated modules without departing from the scope or spirit of the innovation. In this regard, a media input module 102 and categorizing module 106 can exist at a server remote from a user device. Viewer preferences module 110 and/or trigger detection module 104 may be located at the remote server or on the user device. User input module 108 and media output module 112 may be located at a user device. In alternative or complementary embodiments, all elements may exist on the user device, or may be distributed in other manners. Thus, while FIG. 1 illustrates all components in a particular arrangement for ease of explanation, variants will be appreciated in view of aspects disclosed herein.

System 100 may include a media input module 102 that may be adapted to receive video content, including video streams, from one or more cameras, including omni-directional cameras. In an aspect, media input module 102 may be configured to receive a plurality of data streams or transmissions from a plurality of sources. These can include, e.g., wired or wireless connections to other systems which may be direct or carried over networks. Categorizing module 106 which is communicatively coupled with media input module 102 may be configured to categorize video data based on the source of the video data, such as the identity of the camera. In an aspect, the video data may be associated with positional or directional data of the camera. For example, the video data may indicate the relative or absolute position of the camera from which the video data is received. Such video data may include additional details regarding the zooming, focus, aperture, or other characteristics of the camera/data, such as whether the camera is stationary or mobile.

Video data received at media input module 102 may be analyzed by a trigger detection module 104. Trigger detection module 104 may sample the video data to search for predefined triggers and cause an action related to the video data in response to the presence or absence of a trigger in the data. These triggers may be set by a user, for example, or they may be derived from current or past viewer inputs. A trigger can be used to select, deselect, or modify display or handling of one or more video streams. A trigger may be set to any features of the video data that may be identified in order to take action. For example, a trigger may be set to a fixed or changing category of a video feed or portion of an audiovisual media feed. In another alternative or complementary example, triggers may be set to include sound, a certain type of sound, or a certain quality of sound. For example, if video is captured of a person giving a speech, trigger detection module 104 may sample video data to identify video that captures the speaker's voice. In another aspect, a trigger may be based on visual information, such as facial recognition. In the same speech example, trigger detection module 104 may identify videos that include imagery that captures or focuses on the speaker's face. These types of triggers may be used to identify certain video data as high quality, more desirable, more popular, more relevant, and so forth. While embodiments herein allow trigger detection module to assess video in real time as it is received for triggers, analysis of data related to triggers may be aided by or performed in conjunction with data categories.

Triggers may be adaptive. For example, if multiple viewers are focusing their view of a live event on a particular area, a particular person, or the like, trigger detection module 104, alone or in conjunction with categorizing module 106, may use this information to create a trigger. For example, if multiple viewers are focusing their views on a prop on stage, such as a poster board, trigger detection module 104 may create a trigger to identify new video showing the poster board.

Triggers may be event-based. For example, a trigger may include detecting an action or movement by a person. This type of trigger may cause the video output to focus on or change to video showing that person. For example, a trigger may include a person raising their hand, such as to ask a question. Categorizing module 106 may flag (e.g., as high priority) video feed of this person following this trigger, so that a video output may be more likely to output the video showing the person asking a question or making a comment in a meeting. Flags herein can include indications of significance for particular categories determined by categorizing module 106. Significance can be a function of a positive or negative deviation from a baseline or average (e.g., higher or lower quality media, similar or distinct view, similar or distinct amount of noise or interruption, relevance to specific default or user-defined triggers). In this regard, flagged data relating to a media stream may be evaluated first or weighted particularly to causing a trigger to be executed (or not). In at least one embodiment, trigger detection module 104 exclusively analyzes flagged categories, inasmuch as non-flagged categories are irrelevant to the trigger or do not cause the particular media feed to distinguish from other available media feeds.

Another trigger may include a person speaking. Categorizing module 106 may flag video feed of the person speaking (e.g., a person participating in a meeting asking a question) and the person to whom the first person is speaking (e.g., the person who will answer the question). Thus, video feed showing the person's nonverbal (e.g., facial) response to comments from the speaker may be flagged (e.g., as high priority). In this manner, for a back-and-forth exchange between two or more parties, trigger detection module 104 may flag video of the person speaking and the person being spoken to, simultaneously or in succession according to current, past, or projected action. In this regard, categorization and treatment of categories (e.g., flagging) can be dynamic and change with time.

Categorizing module 106 may flag one or more video feeds based on content detected by the video. For example, mentions of specific people may cause video feed capturing those specific people to be flagged (e.g., as high priority). Another event-based trigger may include movement of the speaker. For example, if a speaker gestures, video capturing what the speaker is gesturing towards may be flagged (e.g., as high priority). Movement and other body language, which may be clues to direct a viewer's attention to a specific area/thing may be flagged (e.g., as high priority). For example, if the video that captures an event like a sporting event or other event with a lot of movement, triggers may include flagging video capturing a specific object/person (e.g., the current lead in a race, a football), or specific activity (e.g., a crash in a car race, a tackle, a basketball shot). In embodiments (or at points or in portions of embodiments), video feed capturing the whole event (e.g., a bird's-eye view, a panoramic, or a wide shot) of the entire event may be flagged (e.g., as a high priority).

Triggers may be time-based. For example, a trigger may include an amount of time that has elapsed or remains in an entire event. For example, at end of a meeting, when the participants are gathering their belongings to leave, video feed showing the entire meeting room, rather than video focused on the main speaker, may be flagged. Triggers may include incremental times to keep people aware of how much time they have left to accomplish a particular task. For example, a video feed may show a countdown until the end of the meeting. This video feed may be flagged.

Categorizing module 106 can have a variety of pre-defined or custom categories for on which information relating to video data can be categorized. Some of these categories may relate specifically to triggers which trigger detection module 104 employs to modify outputs to one or more viewers. For example, categorizing module 106 may, through evaluation of video data in view of one or more triggers, categorize video data as low priority. For example, these triggers may include a signal-to-noise ratio that indicates poor sound and/or visual quality. For certain applications, these triggers may be based on facial recognition, filtering out video data that has a number of detected faces above a threshold level, which may indicate the video data is a shot of the audience, which may not be as desirable for viewers as shots of the stage area. Any combination of facial detection, line detection, color detection, or the like may be used by categorizing module 106 and/or trigger detection module 104.

Categorizing module 106 may identify video data or sources of video data based on the triggers. Further, categorizing module 106 can apply one or more tags to data. Tags can include one or more specific categories among the categories associated with a particular video source or data set which can be used as descriptors for searching or association with other data. For example, trigger detection module 104 may tag video data determined to contain a main speaker in the shot as high priority, or the tag may include more detail such as a tag indicating the subject matter contained in the shot (e.g., main speaker). In embodiments, tags may be textual. In embodiments, tags may be graphical (e.g., symbol based) or based on other data (e.g., encoding) which is not natural language text.

Categorizing module 106 may correlate video feeds based on their respective categories and/or triggers related to the video feeds. For example, a correlation tag (which can include a shared or unique tag associated with categorizing of two or more video feeds) may pair a wide angle shot of a basketball game with tagged video feed tracking the movement of the basketball. Video feed of an audience participant may be correlated with video feed of the presenter listening/responding to the participant's comment. A video feed of a timer, such as a shot clock, may be correlated with video feed of the player with possession of the basketball. Video feed of a speaker and the area to which the speaker is gesturing may be correlated.

As suggested, categorizing module 106 may categorize video data in a manner in which the video data is retrievable based on the content of the video, viewer preferences, or the like. The categorizing module 106 may use data from one or more of media input module 102 or trigger detection module 104 to categorize data. Categorizing module 106 may organize and prioritize video data so that it may be identified and retrieved to display to the video output.

In an embodiment, categorizing module 106 may categorize portions of a video stream where multiple views or view types are available. For example, multi- or omni-directional cameras can be used with aspects herein. Inasmuch as a spherical view may be difficult to observe, or users may wish to view one or more portions of the available view, categorizing module 106 can categorize different portions in terms of categories herein. For example, an omni-directional camera may be placed in a meeting room. Categorizing can include identification of the presence of people in portions, the identification of specific people in portions, the presence of a screen or exhibit, portions of the view which are or become obstructed, portions of the view which have interference issues (e.g., light glare, reflections), and others. Accordingly, trigger detection module 104 can analyze for triggers or apply triggers to portions of a single feed inasmuch as a variety of views or actions can be taken in reference to the single feed.

System 100 may also include a user input module 108 that may receive inputs or commands from one or more viewers. User input may indicate a particular view or change in view requested by the viewer. For example, as is known in the art, the viewer may use controls that pan, tilt, or otherwise change the desired view of the immersive video. User input may actively control view of ongoing video feeds, or may be used to develop automation or planned control of future video feeds.

System 100 may include a viewer preferences module 110 that analyzes data received from at least media input module 102 and user input module 108 to derive viewer preferences. These preferences may be specific to the event/performance being recorded in the view received view media input module 102. For example, viewer preferences module 110 may determine that viewers prefer to focus on the video presentation displayed on a screen behind the presenter, rather than focusing on the speaker. In an aspect, these preferences may be expanded and used as generic user preferences to shape triggers for other video data processed by system 100. For example, viewer preferences module 110 may determine that when a speaker is actively pacing across the stage that many users prefer to follow the speaker's face, rather than viewing a wide angle of the stage. These and other types of inferences may be used to determine or alter triggers used by trigger detection module 104, and/or modify categorizing, flagging, tagging, or other handling of video data.

System 100 may include a media output module 112 that may be configured to output one or more video streams. Media output module 112 may output the video based on control by trigger detection module 104. Media output module 112 may include a plurality of video streams that can be selected by a viewing device, such as video feeds that focus on the speaker, a prop, a presentation display, or the like. When user input module 108 indicates a viewer's request for changing the view in some aspect, media output module 112 may be configured to connect the viewer with a different view stream.

Media output module 112 may be programmed to produce a default output based on the prioritization and correlation of video feeds. For example, media output module 112 may automatically change the output feed to high priority video feed, such as video showing a participant asking a question. Media output module 112 may also be programmed to show multiple feeds simultaneously. For example, correlated video may be shown at the same time. These multiple portions of the video feed may be controlled independently. For example, using user input module 108, a viewer may rewind, fast-forward, save, or replay a video feed shown in one window while continuing to watch a live feed in another window. Further, portions of multiple feeds may be combined to provide a desired composite feed. For example, audio from one video stream (e.g., closer to the speaker, less noise, higher quality) can be combined with video from another stream (e.g., selected view, less obstructed, higher quality, more stable) to yield an output conforming to applicable triggers, preferences, or selections.

As those skilled in the art will appreciate, system 100 or a portion of system 100 may comprise one or more operating systems (e.g., Windows, OS, UNIX, Linux, Solaris, Android, or iOS), various conventional support software, or drivers typically associated with computers. Further, system 100 or a portion of system 100 may include any suitable telephone, personal computer, network computer, workstation, minicomputer, mainframe, tablet, mobile device, or the like. System 100 or a portion of system 100 may comprise any combination of hardware or software that communicate with one or more of media input module 102, trigger detection module 104, categorizing module 106, user input module 108, viewer preferences module 110, or media output module 112.

One or more of system 100, media input module 102, trigger detection module 104, categorizing module 106, user input module 108, viewer preferences module 110, or media output module 112 may employ any type of database, such as relational, hierarchical, graphical, object-oriented, or other database configurations. Common database products that may be used include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields, or any other data structure. Association of certain data may be accomplished through any desired data association technique, such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, or the like. The association step may be accomplished by a database merge function, for example, using a "primary key field" (hereinafter "key field"), in pre-selected databases or data sectors.

More particularly, a key field may partition a database associated with one or more of system 100, media input module 102, trigger detection module 104, categorizing module 106, user input module 108, viewer preferences module 110, or media output module 112 according to the high-level class of objects defined by the key field. For example, certain types of data may be designated as a key field in a plurality of related data tables, and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of the disclosure, any suitable data storage technique may be utilized to store data without a standard format. Data sets may be stored using any suitable technique, including, for example, storing individual files using an ISO/DEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, et cetera); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; or other proprietary techniques, which may include fractal compression methods, image compression methods, or the like.

In one exemplary aspect, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using one of fixed storage allocation, circular queue techniques, or best practices with respect to memory management (e.g., paged memory, least recently used). By using BLOB methods, the ability to store various data sets that have different formats facilitates the storage of data associated with the system by multiple and unrelated owners of the data sets. For example, a first data set, which may be stored, may be provided by a first party, a second data set, which may be stored, may be provided by an unrelated second party, and yet a third data set, which may be stored, may be provided by a third party unrelated to the first and second party. Each of these three example data sets may contain different information that is stored using different data storage formats or techniques. Further, each data set may contain subsets of data that also may be distinct from other subsets.

As stated above, in various aspects of one or more of system 100, media input module 102, trigger detection module 104, categorizing module 106, user input module 108, viewer preferences module 110, or media output module 112, the data can be stored without regard to a common format. However, in one exemplary aspect of the disclosure, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set: e.g., LOADED, INITIALIZED, READY, BLOCKED, REMOVABLE, or DELETED. Subsequent bytes of data may be used to indicate for example, the identity of the issuer, user, a transaction or membership account identifier, or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on at least one or more of system 100, media input module 102, trigger detection module 104, categorizing module 106, user input module 108, viewer preferences module 110, or media output module 112, or the like. Furthermore, the security information may restrict/permit only certain actions such as accessing, modifying, or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer, may be received by a standalone interaction device configured to add, delete, modify, or augment the data in accordance with the header or trailer. As such, in one aspect, the header or trailer is not stored on the transaction device along with the associated issuer-owned data, but instead the appropriate action may be taken by providing, to the transaction instrument user at the standalone device, the appropriate option for the action to be taken. A data storage arrangement wherein the header or trailer, or header or trailer history, of the data may be stored on the transaction instrument in relation to the appropriate data. One skilled in the art will also appreciate that, for security reasons, any databases, systems, devices, servers, or other components of one or more of system 100, media input module 102, trigger detection module 104, categorizing module 106, user input module 108, viewer preferences module 110, or media output module 112 may comprise any combination thereof at a single location or at multiple locations, wherein each database or system includes any of various suitable security features, such as firewalls, access codes, encryption, decryption, compression, decompression, or the like.

Figure 2:
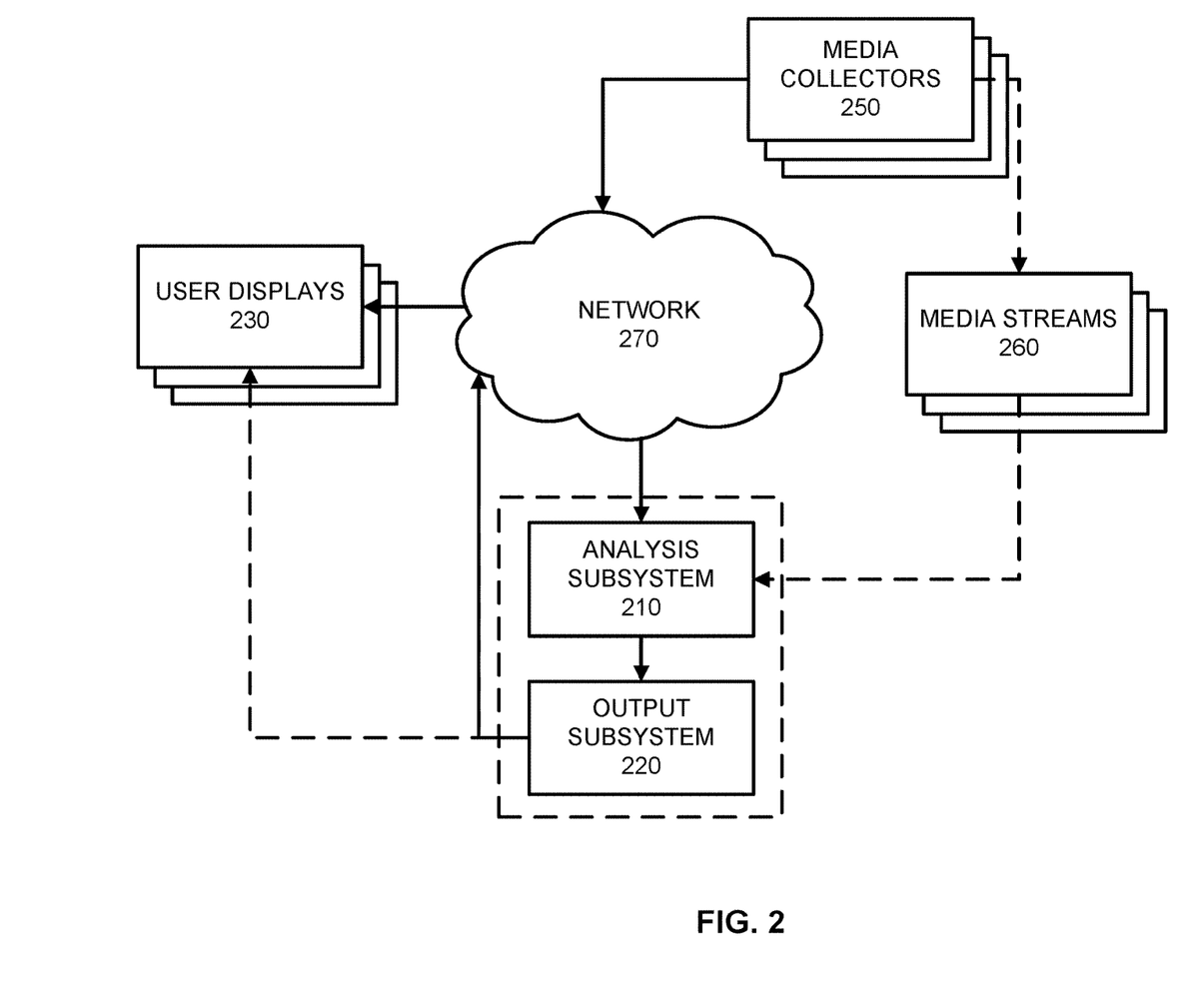
FIG. 2 is a block diagram of another system disclosed herein for handling media data.

FIG. 2 illustrates an example system 200 for implementing aspects described herein. System 200 includes analysis subsystem 210 and output subsystem 220, which receive, transform, and send data between other elements of system 200.

Media collectors 250 can include a variety of sensors which collect video, audio, and other data. These sensors can provide at least some of media streams 260. Additional media streams 260 can be provided from, e.g., storage or other sources available locally or over a network such as network 270. While media streams 260 are shown outside network 270, in embodiments one or more of media streams 260 can exist within network 270. In embodiments, sensors can include conventional cameras, wide angle cameras, multi-directional cameras, omni-directional cameras, temperature sensors such as thermal cameras, image-intensifier tubes and cameras, and other image-gathering sensors. In embodiments, one or more microphones, located in one or more locations, can be included.

In embodiments, other sensors, including meters, gages, and others can be included. Where sensor data cannot be integrated into a media stream, it may be included with the media stream to assist with categorizing the media stream, including flagging and tagging. For example, temperature, vibration, the presence or absence of amounts of chemicals, voltage, current, flow, velocity, acceleration, orientation, the presence or absence of amounts of radiation, location, pressure, mass or weight, force, density, level, proximity, light, and other variables can be measured by sensors. Triggers can be dependent on the values of such sensor-based variables. In an example, engineering, security, production, or administration personnel may set triggers related to these variables to assist with monitoring and observation of facilities, particularly when other events such as meetings are occurring.

Analysis subsystem 210 can receive the media streams 260 and perform analysis on the media streams, such as performing aspects described in relation to media input module 102, trigger detection module 104, and/or categorizing module 106. When media is categorized, tagged, and/or flagged, and/or when triggers are identified therein, data can be provided to output subsystem 220. Output subsystem 220 can perform aspects described in relation to, e.g., viewer preferences module 110 and/or media output module 112.

In embodiments, analysis subsystem 210 and output subsystem 220 can be collocated physically and/or logically. In alternative embodiments, analysis subsystem 210, output subsystem 220, and/or elements thereof can be located at disparate locations, including being distributed on a variety of devices including but not limited to the user device, a network server associated with a media or communication service, and/or other network devices.

Figure 3:
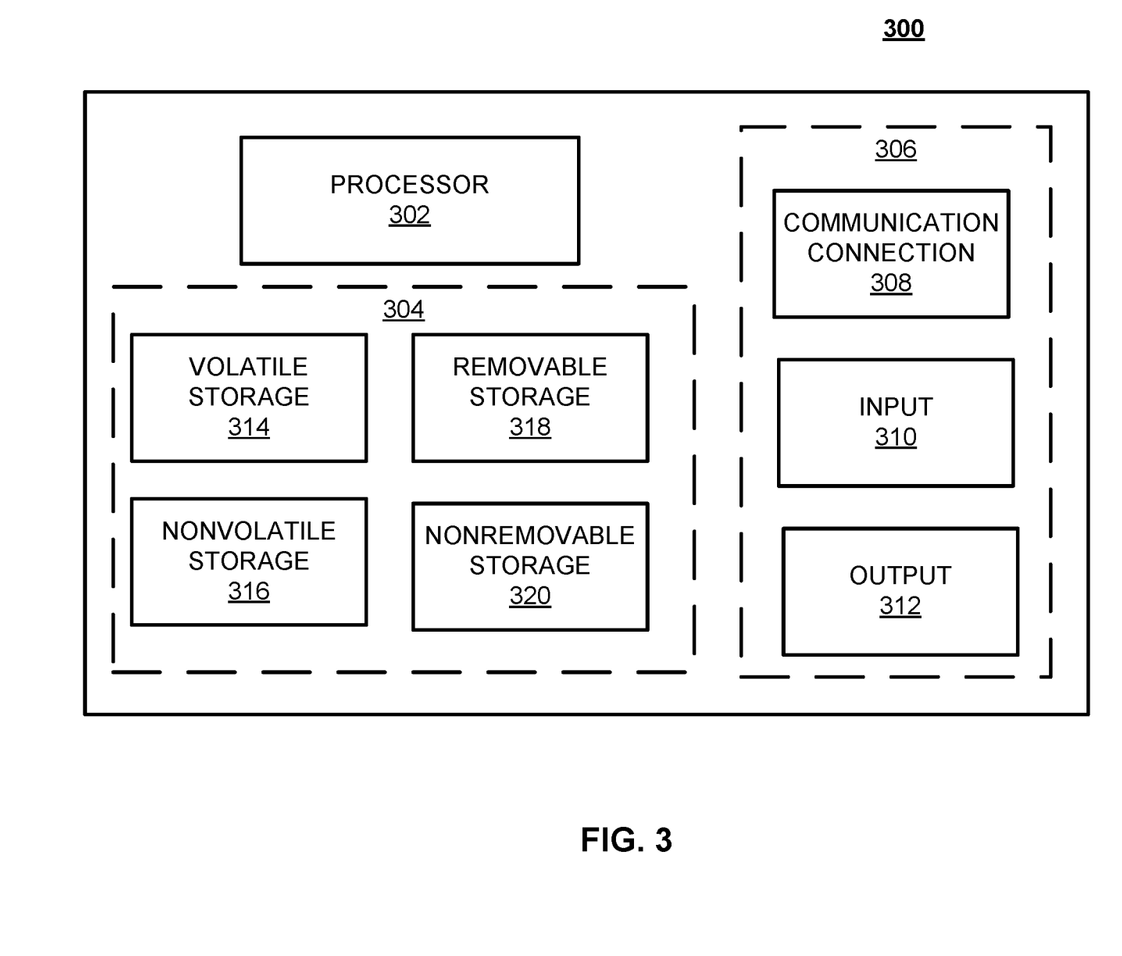
FIG. 3 is a block diagram illustrating an exemplary implementation of a device that may be used to implement at least a portion of the immersive video system.

Turning to FIG. 3, device 300 may comprise all or a part of systems 100 and/or 200. Device 300 may comprise hardware or a combination of hardware and software. The functionality to facilitate telecommunications via a telecommunications network may reside in one or combination of more than one systems 100. Device 300 depicted in FIG. 3 may represent or perform functionality of an appropriate device 300, or combination of systems 100, such as, for example, a component or various components of a cellular broadcast system wireless network, a processor, a server, a gateway, a node, a mobile switching center (MSC), a short message service center (SMSC), an ALFS, a gateway mobile location center (GMLC), a radio access network (RAN), a serving mobile location center (SMLC), or the like, or any appropriate combination thereof. It is emphasized that the block diagram depicted in FIG. 3 is exemplary and not intended to imply a limitation to a specific implementation or configuration. Thus, device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, device 300 is not to be construed as software per se.

In addition to processor 302 and memory 304, device 300 may include an input/output system 306. Processor 302, memory 304, and input/output system 306 may be coupled together (coupling not shown in FIG. 3) to allow communications therebetween. Each portion of device 300 may comprise circuitry for performing functions associated with each respective portion. Thus, each portion may comprise hardware, or a combination of hardware and software. Accordingly, each portion of device 300 is not to be construed as software per se. Input/output system 306 may be capable of receiving or providing information from or to a communications device or other network entities configured for telecommunications. For example input/output system 306 may include a wireless communications (e.g., WiFi/2.5G/3G/4G/GPS) card. Input/output system 306 may be capable of receiving or sending video information, audio information, control information, image information, data, or any combination thereof. Input/output system 306 may be capable of transferring information with device 300. In various configurations, input/output system 306 may receive or provide information via any appropriate means, such as, for example, optical means (e.g., infrared), electromagnetic means (e.g., RF, WiFi, Bluetooth®, ZigBee®), acoustic means (e.g., speaker, microphone, ultrasonic receiver, ultrasonic transmitter), or a combination thereof. In an example configuration, input/output system 306 may comprise a WiFi finder, a two-way GPS chipset or equivalent, or the like, or a combination thereof.

Input/output system 306 of device 300 also may contain communication connection 308 that allows device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of device 300, determining a type of broadcast message and acting according to the broadcast message type or content, as described herein.

Memory 304 of device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a nonremovable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by device 300. Memory 304 may comprise executable instructions that, when executed by processor 302, cause processor 302 to effectuate operations to map signal strengths in an area of interest.

Figure 4:
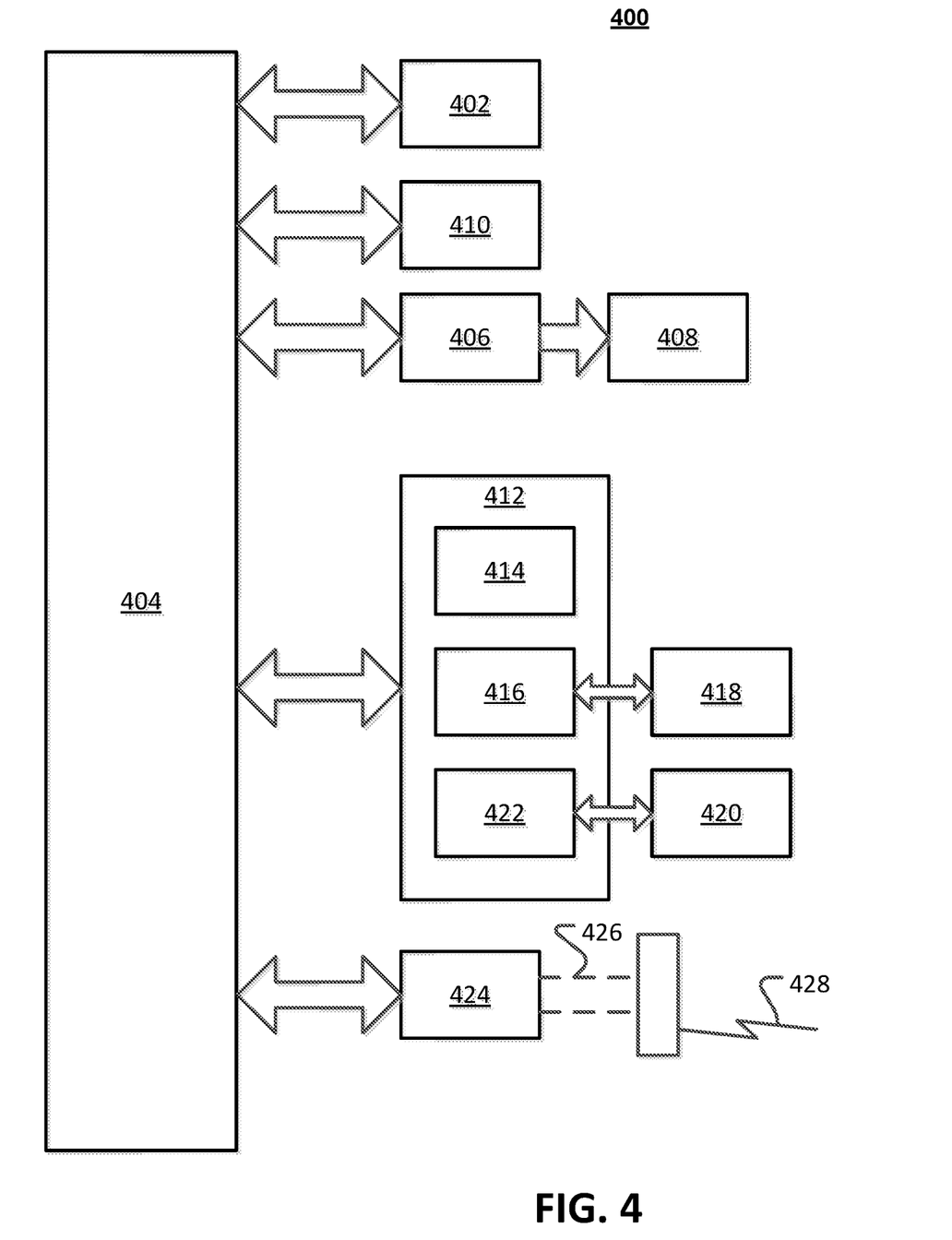
FIG. 4 is a block diagram of a computer system that may be used to implement at least a portion of the immersive video system.

FIG. 4 illustrates a computer-based system 400 that may constitute or include parts of one or more of systems 100 and/or 200, media input module 102, trigger detection module 104, categorizing module 106, user input module 108, viewer preferences module 110, media output module 112, or device 300. Computer-based system 400 includes at least one processor, such as a processor 402. Processor 402 may be connected to a communication infrastructure 404, for example, a communications bus, a cross-over bar, a network, or the like. Various software aspects are described in terms of this example computer-based system 400. Upon perusal of the present description, it will become apparent to a person skilled in the relevant art(s) how to implement the present disclosure using other computer systems or architectures.

Computer-based system 400 includes a display interface 406 that forwards graphics, text, or other data from communication infrastructure 404 or from a frame buffer (not shown) for display on a display unit 408.

Computer-based system 400 further includes a main memory 410, such as random access memory (RAM), and may also include a secondary memory 412. Secondary memory 412 may further include, for example, a hard disk drive 414 or a removable storage drive 416, representing a floppy disk drive, a magnetic tape drive, an optical disk drive, et cetera. Removable storage drive 416 reads from or writes to a removable storage unit 418 in a well-known manner. Removable storage unit 418 may represent a floppy disk, magnetic tape, or an optical disk, and may be read by and written to by removable storage drive 416. As will be appreciated, removable storage unit 418 includes a computer usable storage medium having computer software or data stored therein.

In accordance with various aspects of the present disclosure, secondary memory 412 may include other similar devices for allowing computer programs or other instructions to be loaded into computer-based system 400. Such devices may include, for example, a removable storage unit 420 and an interface 422. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from removable storage unit 420 to computer-based system 400.

Computer-based system 400 may further include communication interface 424. Communication interface 424 may allow software or data to be transferred between computer-based system 400 and external devices. Examples of communication interface 424 include, but may not be limited to a modem, a network interface (such as an Ethernet card), a communications port, a Personal Computer Memory Card International Association (PCMCIA) slot and card, or the like. Software or data transferred via communication interface 424 may be in the form of a number of signals, hereinafter referred to as signals 426, which may be electronic, electromagnetic, optical or other signals capable of being received by communication interface 424. Signals 426 may be provided to communication interface 424 via a communication path (e.g., channel) 428. Communication path 428 carries signals 426 and may be implemented using wire or cable, fiber optics, a telephone line, a cellular link, a radio frequency (RF) link, or other communication channels.

In this document, the terms "computer program medium" and "computer usable medium" are used to generally refer to media such as removable storage drive 416, a hard disk installed in hard disk drive 414, or the like. These computer program products provide software to computer-based system 400. The present disclosure is directed to such computer program products.

Computer programs (also referred to as computer control logic) may be stored in main memory 410 or secondary memory 412. The computer programs may also be received via communication interface 404. Such computer programs, when executed, enable computer-based system 400 to perform the functions consistent with the present disclosure, as discussed herein. In particular, the computer programs, when executed, enable processor 402 to perform the features of the present disclosure. Accordingly, such computer programs represent controllers of computer-based system 400.

In accordance with an aspect of the present disclosure, where the disclosure is implemented using a software, the software may be stored in a computer program product and loaded into computer-based system 400 using removable storage drive 416, hard disk drive 414, or communication interface 424. The control logic (software), when executed by processor 402, causes processor 402 to perform the functions of the present disclosure as described herein.

In another aspect, the present disclosure is implemented primarily in hardware using, for example, hardware components, such as application specific integrated circuits (ASIC). Implementation of the hardware state machine to perform the functions described herein will be apparent to persons skilled in the relevant art(s). In yet another aspect, the present disclosure is implemented using a combination of both the hardware and the software. In another aspect, the present disclosure is implemented using software.

Figure 5:
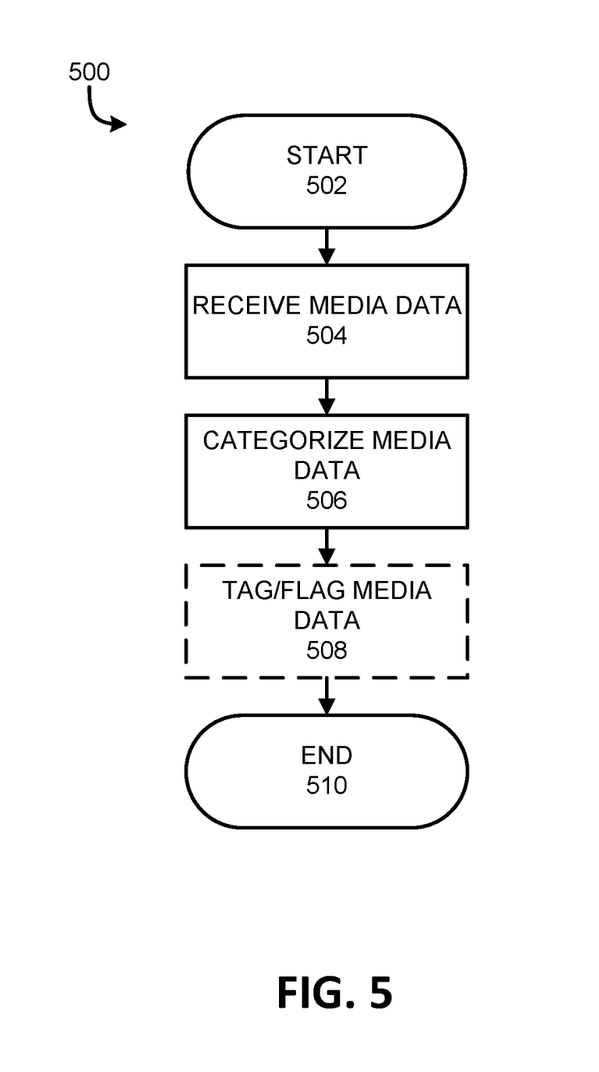
FIG. 5 is a flow chart of an example methodology for handling media data disclosed herein.

FIG. 5 illustrates a flow chart of an example methodology 500 for handling livestreams or other media feeds. Methodology 500 begins at 502 and proceeds to 504 where media data is received. Media data can include, but is not limited to, one or more streams or feeds of video and/or audio data, with or without associated additional information (e.g., non-playable sensor data). In embodiments, media data can be received as a live stream from one or more cameras, including omni-directional cameras.

At 506, categorizing of media data can be performed (e.g., by categorizing module 106) as described herein. Categorizing can be performed on a variety of categories which may or may not relate to particular triggers. Based on categorizing, at 508, in some embodiments media or portions thereof may be tagged or flagged to aid with media identification, defining of triggers (which may be manual or automatic), and/or triggering of actions based on triggers. Thereafter, at 510, methodology 500 may end.

Figure 6:
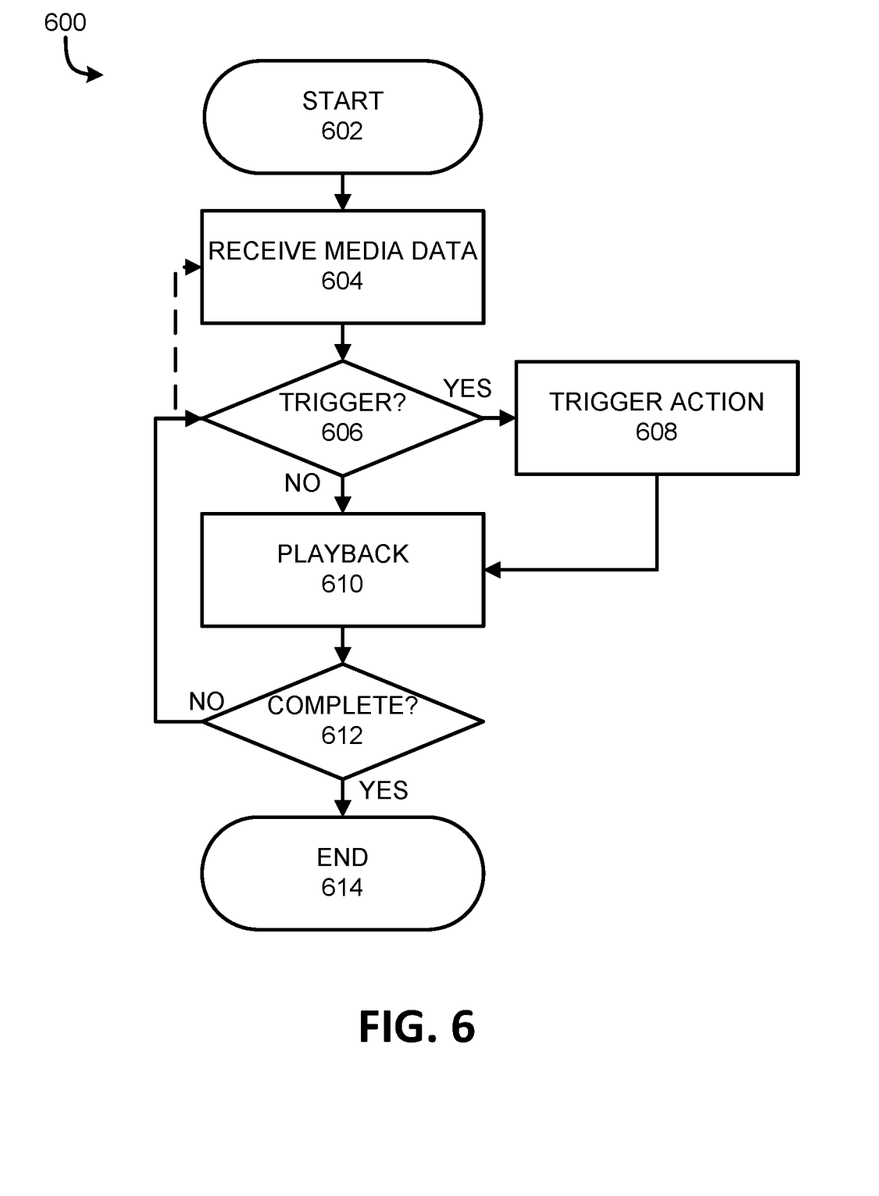
FIG. 6 is a flow chart of another example methodology for handling media data disclosed herein.

FIG. 6 illustrates a flow chart of an example methodology 600 for handling livestreams and other media. Methodology 600 begins at 602 and proceeds to 604 where media data is received. In embodiments, at least part of the media data received has been processed in accordance with methodology 500. In alternative or complementary embodiments, at least a part of the media data received has not been processed in accordance with methodology 500.

At 606, a determination is made as to whether a trigger is discovered in the received media data. If one or more triggers is discovered, methodology 600 can perform various trigger actions at 608 before proceeding to continue playback at 610.

Trigger actions can include, in various embodiments, selecting a particular portion of media for playback during a particular period of time. This can include selecting a particular stream or view, cropping or modifying a particular stream or view, or taking various other actions described herein. In an embodiment, selection of one or more portions of a single feed can be performed based on triggers. For example, one or more portions of video viewable using an omni-directional camera from the entirety of available video can be shown or not shown based on triggers relating to those portions. Non-continuous portions of video collected (e.g., intervening space not shown) can be combined (e.g., in two frames or in successive periods of time) based on triggers. Further, portions of multiple feeds can be merged, either in successive time periods, different frames, or in combinable elements (e.g., audio from first set of feeds, video from second set of feeds).

Thereafter, or if no trigger is discovered at 606, methodology 600 can proceed to playback (or other handling) of the media at 610. After 610, a determination can be made at 612 as to whether playback is complete. If playback is not complete, methodology 600 can recycle to 606 where media data is monitored for triggers (and/or 604 to receive additional media data). This cycle can be performed continuously, essentially collapsing elements of methodology 600 into a single or combined aspect, with media being observed in an ongoing fashion before or during playback to identify any and/or all triggers. If playback is determined to be complete at 612, methodology 600 can proceed to end at 614.

Various aspects disclosed herein are to be taken in the illustrative and explanatory sense, and should in no way be construed as limiting of the present disclosure. All numerical terms, such as, but not limited to, "first" and "second" or any other ordinary or numerical terms, should also be taken only as identifiers, to assist the reader's understanding of the various aspects, variations, components, or modifications of the present disclosure, and may not create any limitations, particularly as to the order, or preference, of any aspect, variation, component or modification relative to, or over, another aspect, variation, component or modification.

It is to be understood that individual features shown or described for one aspect may be combined with individual features shown or described for another aspect. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

The present disclosure is described herein with reference to system architecture, block diagrams, flowchart illustrations of methods, and computer program products according to various aspects of the disclosure. It will be understood that each functional block of the block diagrams and the flowchart illustrations, and combinations of functional blocks in the block diagrams and flowchart illustrations, respectively, can be implemented by computer program instructions.

These software elements may be loaded onto a general-purpose computer, special-purpose computer, or other programmable data processing apparatus to produce a machine, such that the instructions that execute on the computer or other programmable data-processing apparatus create means for implementing the functions specified in the flowchart block or blocks. These computer program instructions may also be stored in a computer-readable memory that can direct a computer or other programmable data-processing apparatus to function in a particular manner, such that the instructions stored in the computer-readable memory produce an article of manufacture including instruction means that implement the function specified in the flowchart block or blocks. The computer program instructions may also be loaded onto a computer or other programmable data-processing apparatus to cause a series of operational steps to be performed on the computer or other programmable apparatus to produce a computer-implemented process, such that the instructions that execute on the computer or other programmable apparatus provide steps for implementing the functions specified in the flowchart block or blocks. In an aspect, the computer program instructions may be executed on any remote-hosted application framework, for example, by a processor associated with a cloud server.

Accordingly, functional blocks of the block diagrams and flow diagram illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, websites, web forms, prompts, et cetera. Practitioners will appreciate that the illustrated steps described herein may comprise in any number of configurations including the use of windows, web pages, hypertexts, hyperlinks, web forms, popup windows, prompts, and the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

The systems, methods and computer program products disclosed in conjunction with various aspects of the present disclosure are embodied in systems and methods for facilitating multiple types of communications via a network-based portal.

While aspects of the present disclosure have been particularly shown and described with reference to the examples above, it will be understood by those skilled in the art that various combinations of the disclosed aspects or additional aspects may be contemplated by the modification of the disclosed machines, systems and methods without departing from the spirit and scope of what is disclosed. Such aspects should be understood to fall within the scope of the present disclosure as determined based upon the claims and any equivalents thereof

What is claimed is:

1. A method, comprising:
   receiving two or more streams of media data from two or more sensors;
   identifying a first trigger associated with a first triggered stream among the two or more streams, wherein the first trigger is responsive to an action detected by one of the two or more sensors;
   identifying a second trigger associated with a second triggered stream among the two or more streams of media data;
   correlating the first triggered stream to the second triggered stream;
   merging at least a video portion of the first triggered stream and an audio portion of the second triggered stream for playback,
     wherein the video portion contains higher quality video data than video data associated with the second triggered stream based on one or more of lighting, the presence or absence of glare, the presence or absence of reflections, stream resolution, camera stability, the presence or absence of obstructions, or an amount of noise, and
     wherein the audio portion contains higher quality audio data than audio data associated with the first triggered stream based on a signal to noise measurement.

2. The method of claim 1,
   wherein the first trigger and the second trigger are associated with different portions of an event captured in the two or more streams.

3. The method of claim 1, comprising:
   modifying at least one of the first triggered stream and the second triggered stream based on at least one of the first trigger and the second trigger.

4. The method of claim 1, comprising:
   categorizing the two or more streams of media data to produce category data.

5. The method of claim 4, wherein categorizing the two or more streams of media data includes tagging at least one among the two or more streams of media data.

6. The method of claim 4, wherein categorizing the two or more streams of media data includes flagging at least one among the two or more streams of media data.

7. The method of claim 1, comprising:
   receiving a user input, wherein the first trigger is based at least in part on the user input.

8. The method of claim 1, comprising:
   causing playback of at least the video portion of the first triggered stream based on the first trigger; and causing playback of the audio portion of the second triggered stream at least partially coincident with at least the video portion of the first triggered stream based on the second trigger.

9. A system, comprising:
a media input module configured to receive two or more streams of media data from two or more sensors;
a trigger detection module configured to identify a first trigger associated with a first triggered stream among the two or more streams, wherein the first trigger is responsive to an action detected by one of the two or more sensors,
wherein the trigger detection module is further configured to identify a second trigger associated with a second triggered stream among the two or more streams of media data;
a categorizing module configured to correlate the first triggered stream to the second triggered stream; and
a media output module configured to merge at least a video portion of the first triggered stream and an audio portion of the second triggered stream for playback,
wherein the video portion contains higher quality video data than video data associated with the second triggered stream based on one or more of lighting, the presence or absence of glare, the presence or absence of reflections, stream resolution, camera stability, the presence or absence of obstructions, or an amount of noise, and
wherein the audio portion contains higher quality audio data than audio data associated with the first triggered stream based on a signal to noise measurement.

10. The system of claim 9, comprising:
a viewer preferences module configured to monitor user behavior, wherein the first trigger is based on user behavior.

11. The system of claim 9, wherein the categorizing module is configured to categorize the two or more streams of media data to produce category data.

12. The system of claim 11, wherein categorizing the two or more streams of media data includes tagging at least one among the two or more streams of media data.

13. The system of claim 11, wherein categorizing the two or more streams of media data includes flagging at least one among the two or more streams of media data.

14. The system of claim 9, wherein the first trigger and the second trigger are associated with different portions of an event captured in the two or more streams.

15. The system of claim 9,
wherein playback of at least the video portion of the first triggered stream is based on the first trigger, and
wherein playback of the audio portion of the second triggered stream at least partially coincident with at least the video portion of the first triggered stream is based on the second trigger.

16. A non-transitory computer-readable medium storing a computer product that when used performs operations comprising:
receiving two or more streams of media data from two or more sensors;
identifying a first trigger associated with a first triggered stream among the two or more streams, wherein the first trigger is responsive to an action detected by one of the two or more sensors;
identifying a second trigger associated with a second triggered stream among the two or more streams of media data;
correlating the first triggered stream to the second triggered stream;
merging at least a video portion of the first triggered stream and an audio portion of the second triggered stream for playback,
wherein the video portion contains higher quality video data than video data associated with the second triggered stream based on one or more of lighting, the presence or absence of glare, the presence or absence of reflections, stream resolution, camera stability, the presence or absence of obstructions, or an amount of noise, and
wherein the audio portion contains higher quality audio data than audio data associated with the first triggered stream based on a signal to noise measurement.

17. The non-transitory computer-readable medium of claim 16, the operations comprising:
modifying at least one of the first triggered stream and the second triggered stream based on at least one of the first trigger and the second trigger.

18. The non-transitory computer-readable medium of claim 16, the operations comprising:
categorizing the two or more streams of media data to produce category data.

19. The non-transitory computer-readable medium of claim 16, the operations comprising:
receiving a user input, wherein the first trigger is based at least in part on the user input.

20. The non-transitory computer-readable medium of claim 16, the operations comprising:
causing playback of at least the video portion of the first triggered stream based on the first trigger; and
causing playback of the audio portion of the second triggered stream at least partially coincident with at least the video portion of the first triggered stream based on the second trigger.

* * * * *